United States Patent [19]

Mennucci et al.

[11] 4,181,205
[45] Jan. 1, 1980

[54] VISCOUS FLUID COUPLING

[75] Inventors: Donald F. Mennucci, Mount Clemens; John T. Auman, Washington, both of Mich.

[73] Assignee: General Motors Corporation, Detroit, Mich.

[21] Appl. No.: 924,147

[22] Filed: Jul. 13, 1978

[51] Int. Cl.² .................................................. F16D 35/00
[52] U.S. Cl. .................................. 192/58 B; 192/82 T; 192/113 A
[58] Field of Search ................ 192/58 B, 82 T, 113 A

[56] References Cited

U.S. PATENT DOCUMENTS

| | | | |
|---|---|---|---|
| 3,075,691 | 1/1963 | Kelley | 192/82 T |
| 3,250,355 | 5/1966 | Weir | 192/58 B |
| 3,263,783 | 8/1966 | Sutaruk | 192/58 B |
| 3,584,716 | 6/1971 | Coty | 192/58 B |
| 3,993,415 | 11/1976 | Hauser | 192/113 A X |

*Primary Examiner*—Andrew V. Kundrat
*Attorney, Agent, or Firm*—John P. Moran

[57] ABSTRACT

The drawings illustrate a viscous fluid coupling including driven means comprising a housing with a front cover member having cooling fins thereon and rotatably mounted on an engine-driven drive shaft, driving means including a drive plate mounted on the drive shaft within the housing, opposed shear surfaces formed on the drive plate and the adjacent surface of the housing disposed in close face-to-face and spaced relationship, and a viscous fluid in the housing for creating fluid drive coupling of the housing and the drive plate. The improvement comprises a sleeve-type hub coaxial with the cover member and spaced axially from the usual cover-mounted bimetal temperature sensor and a plurality of circumferentially spaced, radially oriented, canted fan blades having their inner ends attached to the hub and having at least their outer ends attached to the cover member inwardly of the outer periphery thereof for aiding in the cooling of the viscous fluid.

4 Claims, 7 Drawing Figures

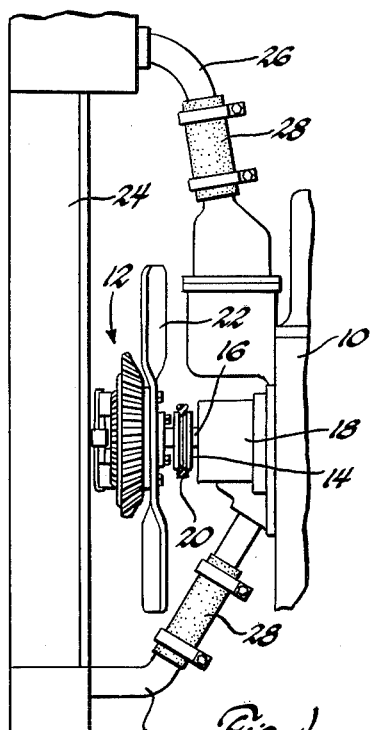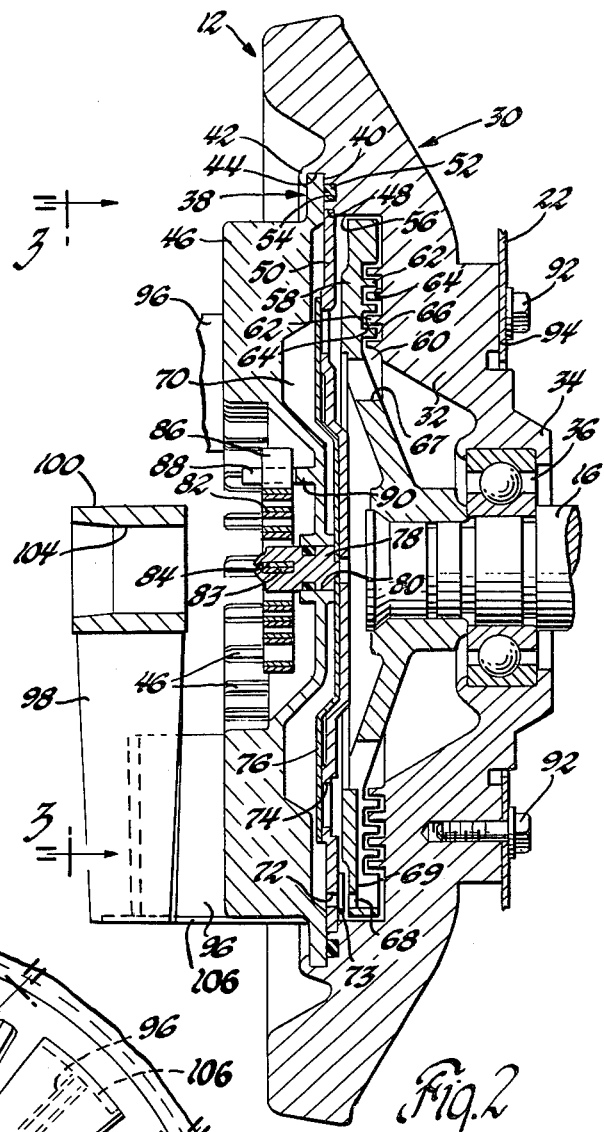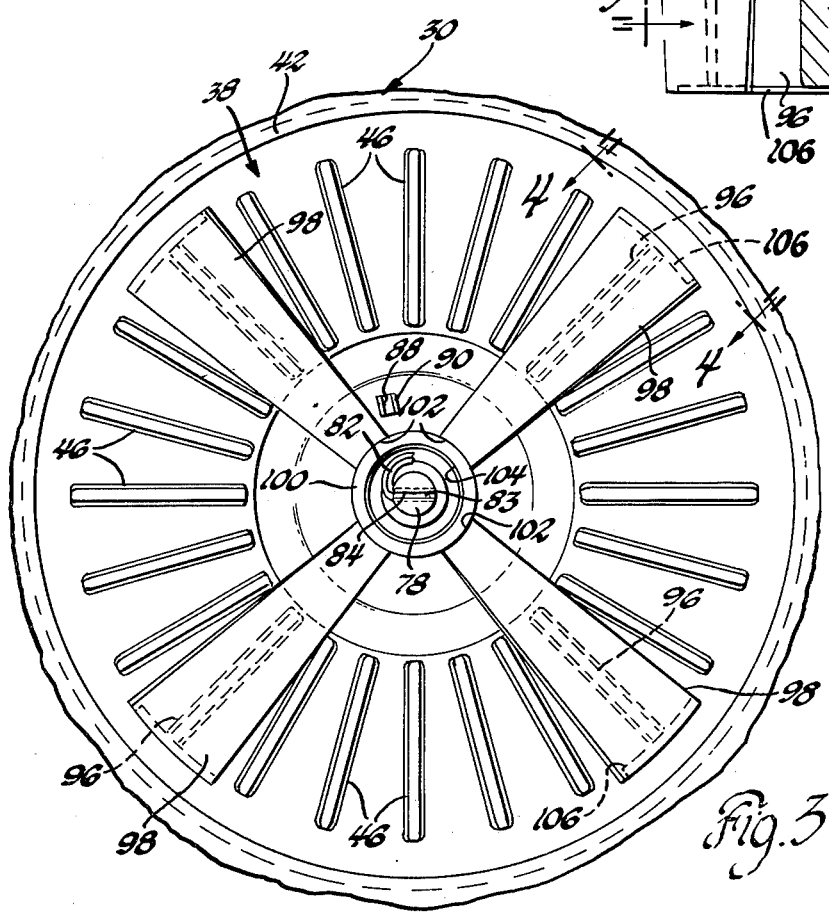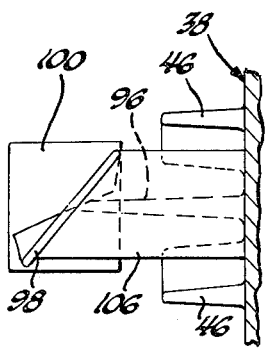

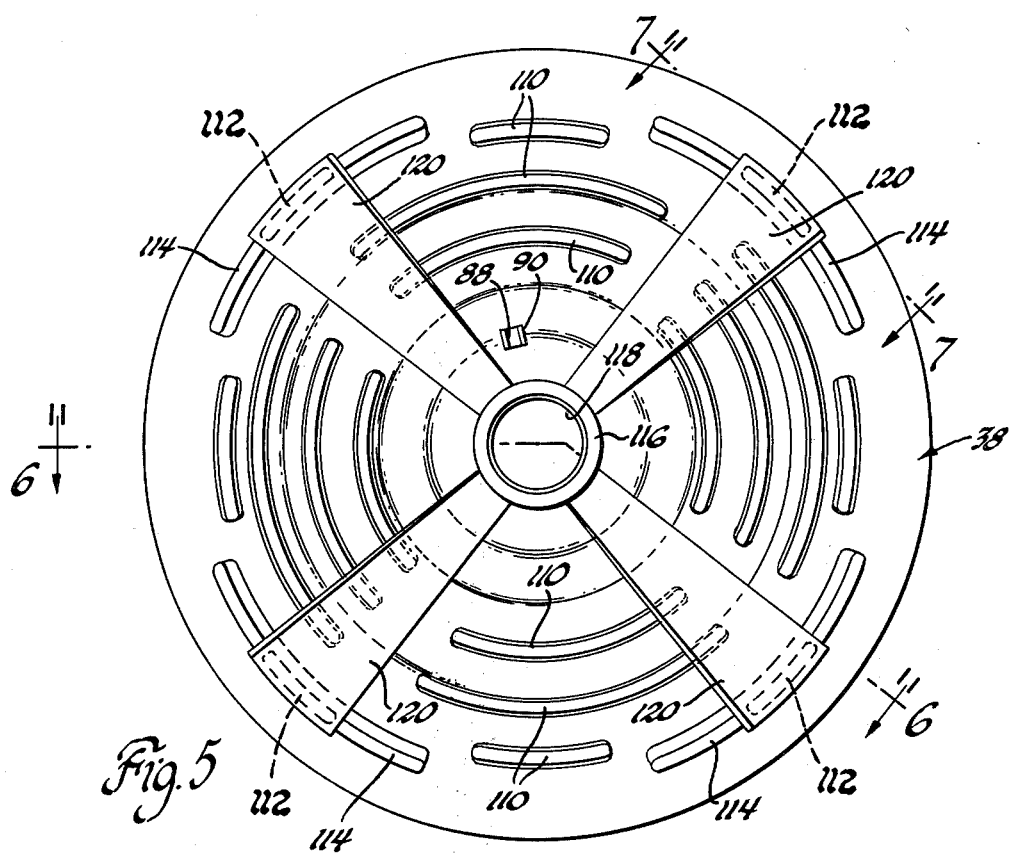
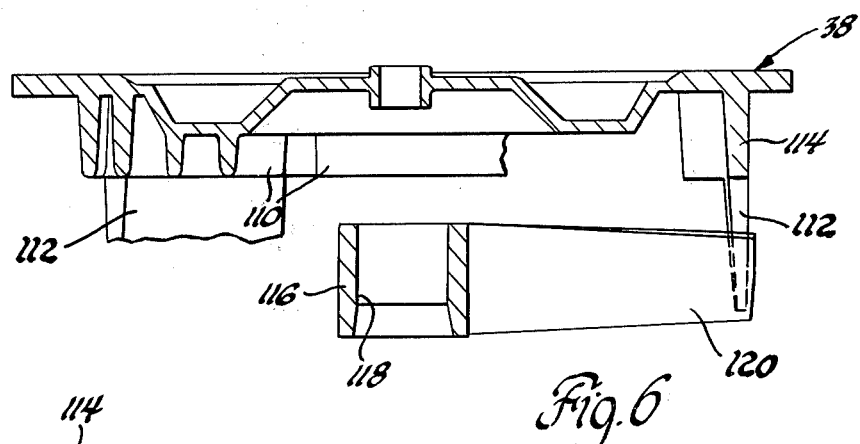
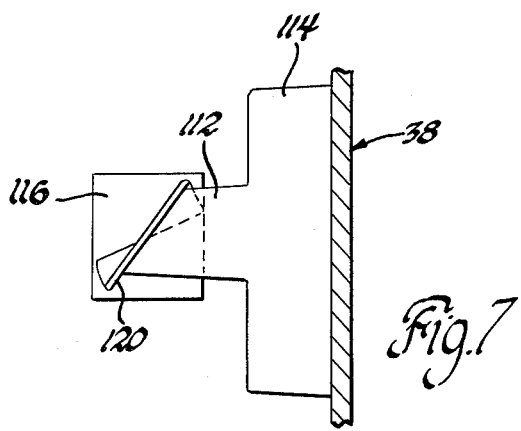

VISCOUS FLUID COUPLING

This invention relates generally to viscous fluid couplings and, more particularly, to cooling means for the viscous fluid thereof.

It is common practice in the viscous fluid coupling and clutch art to provide radially extending heat dissipating ribs or fins on the outer peripheral portions of either or both the housing and its front cover member, in order to help cool the viscous fluid which serves as the torque-transmitting medium within the housing. While the use of such fins as a cooling means is generally satisfactory, for viscous fluid couplings or clutches used in particular vehicular applications, e.g., on some large trucks, a central "dead air spot" is created at times by a suction characteristic associated with the action of the regular cooling fan blades. As a result, the usual viscous fluid may become heated under some operational conditions to a point beyond a predetermined temperature such that it deteriorates as an effective torque-transmitting medium by virtue of chemically changing to a substantially thicker, lower viscosity fluid. As such, it does not flow out of the usual viscous shear space in an efficient manner and, thus, causes unnecessary and undesirable fan noise. Therefor it is desirable to provide additional cooling means associated with the front cover member in order to alleviate this problem. Accordingly, it is a general object of this invention to provide such additional cooling means on the front cover member of a viscous fluid coupling.

Another object of the invention is to provide an improved viscous fluid coupling for particular vehicle applications wherein the usual front cover cooling fins are supplemented by blade means in addition to the regular fan blades.

A further object of the invention is to provide supplemental integral cooling means for a viscous fluid coupling for vehicle use wherein the coupling includes a housing with a front cover member having conventional cooling fins thereon and rotatably mounted on an engine-driven drive shaft, a drive plate mounted on the shaft within the housing for rotation with the shaft, opposed shear surfaces on the drive plate and the adjacent surface of the housing disposed in close face-to-face and spaced relationship, and a viscous fluid in the housing for creating fluid drive coupling of the housing and the drive plate. The supplemental integral cooling means includes a sleeve-type hub coaxial with the cover member and spaced axially from the cover-mounted ambient temperature sensor, and a plurality of circumferentially spaced, radially oriented, canted fan blades whose inner ends are attached to the hub and whose outer ends are attached to the cover member inwardly of the outer periphery thereof. The canted blades serve to continually aid in cooling the internal viscous fluid during the engaged mode, to thus maintain its efficiency as a fluid drive medium.

These and other objects and advantages of the invention will be apparent when reference is made to the following description and accompanying drawings, wherein:

FIG. 1 is a fragmentary side elevational view of a radiator and engine having viscous fluid clutch-driven cooling fan associated therewith;

FIG. 2 is an enlarged cross-sectional view of a viscous fluid, shear-type clutch embodying the invention;

FIG. 3 is a fragmentary end view taken along the plane of the line 3—3 of FIG. 2, and looking in the direction of the arrows;

FIG. 4 is a fragmentary end view taken along the plane of the line 4—4 of FIG. 3, and looking in the direction of the arrows;

FIG. 5 is a view similar to FIG. 3 showing an alternate embodiment of the invention; and FIGS. 6 and 7 are cross-sectional views taken along the planes of the lines 6—6 and 7—7 of FIG. 5, respectively, and looking in the direction of the arrows.

Referring now to the drawings in greater detail, FIG. 1 illustrates an engine 10 having a typical viscous fluid clutch 12 and a pulley 14 mounted on a drive shaft 16 extending from the conventional water pump 18, the pulley 14 being rotated by a V-belt 20 connected to the crankshaft (not shown) for driving a cooling fan 22 secured to the clutch 12. The fluid clutch 12 and the cooling fan 22 are located between the engine 10 and a radiator 24. The usual conduits 26 and associated hoses 28 communicate between the radiator 24 and the engine 10 adjacent the water pump 18.

Referring next to FIG. 2, the fluid clutch 12 typically includes a housing or output member 30 including a rear wall member 32 having a hub 34 rotatably mounted by a suitable bearing 36 on the drive shaft 16. The housing 30 further includes a cover or front wall member 38 which has an annular flat surface 40 formed adjacent its peripheral edge, the latter being confined by an annular lip 42 in an annular recess 44 formed in the housing 30. Radially extending cooling fins 46 are formed on the outer surface of the cover member 38. A second annular recess 48 is formed in the rear wall member 32 radially inward of the outer periphery of the first annular recess 44. A divider wall or pump plate 50 is mounted with its outer edge extending into the recess 48 intermediate the cover member 38 and the rear wall member 32. A seal 52 is compressed by the flat surface 40 of the cover member 38 in an annular groove 54 formed in the rear wall member 32 intermediate the outer edges of the annular recesses 44 and 48. A third annular deeper recess 56 is formed in the rear wall member 32 radially inward of the second annular recess 48. A clutch plate 58 is secured at its center by any suitable means to the drive shaft 16, the outer peripheral portion thereof being freely located in an operating or working chamber 60 formed by the third annular recess 56.

Adjacent portions of the clutch plate 58 and the rear wall member 32 are provided with torque-transmitting elements consisting of cooperating annular ridge and groove elements 62 and 64, respectively, with an intervening fluid shear space 66 therebetween to accommodate a suitable viscous fluid, such as silicone, as a torque-transmitting medium.

The clutch plate 58 further includes a plurality of equispaced openings 67 formed therein at a point radially inward from the ridge and groove elements 62 and 64. A pair of oppositely disposed smaller openings 68 are formed in the clutch plate 58 adjacent the outermost edge thereof. A pair of radial grooves such as V-shaped grooves 69, are formed in the clutch plate 58 across the ridges 62 and terminating at the openings 67. The grooves 69 assist in the processes of filling and removing the fluid medium operative in the working chamber 60.

The front wall or cover member 38 includes a contoured portion intermediate the center and peripheral edge thereof which forms an annular reservoir 70 with the pump plate 50. One or more pump outlet openings 72 are formed through the pump plate 50 circumferentially adjacent pump or dam elements 73 formed on the pump plate 50, the opening 72 communicating between the working chamber 60 and the annular reservoir 70.

One or more inlet ports 74 (FIG. 2) are also formed in the pump plate 50, communicating between the annular reservoir 70 and the working chamber 60 radially inward of the pump elements 73 and the pump outlet openings 72.

The inlet port 74 is at times closed off by a valve member 76, which is normally responsive to ambient temperature changes, and which is secured in any suitable manner on a center pin or shaft 78, which is rotatably mounted in a central opening 80 formed in the front wall or cover member 38. A suitable bimetallic thermostatic valve control element 82 is provided with an inwardly extending end-portion 83 which is mounted in a transverse slot 84 formed in the pin 78. An outwardly extending end-portion 86 of the bimetallic 82 is restrained by virtue of being inserted in a slot 88 formed in a post 90 formed on the cover member 38. With this arrangement, a change in ambient temperature either winds or unwinds the bimetallic element 82 shown, resulting in rotation of the pin 78 and the valve member 76, to thus control the flow of fluid medium from the reservoir 68 through the inlet port 74 to the working chamber 60.

As is well known to those skilled in the fluid clutch art, upon rotation of the clutch plate 58 by the input shaft 16, via the pulley 14, torque is transmitted to the adjacent housing or output member 30 by the shear action of the fluid medium in the working chamber 60. Rotation of the output member or housing 30 effects rotation of the cooling fan 22 secured by bolts 92 to a mounting surface 94 formed on the housing 30, the speed thereof being influenced by the shear drive of the variable volume of fluid medium in the chamber 60.

The latter chamber 60 is substantially emptied by virtue of the fluid medium being pumped through the continuously open pump outlet opening 72 by the action of the pump element 73 serving as a dam or wiper, forcing the fluid to flow into the opeing 72 and, thence, into the annular reservoir 70. Under this condition, commonly known as the "disengaged mode", the slip between the clutch plate 58 and the housing 30 is greatest, and fan 22 speed is correspondingly low.

Once ambient temperature increases to a predetermined level, the bimetallic thermostatic valve control element 82 unwinds, progressively uncovering the inlet port 74 in the pump plate 50, permitting the fluid to flow through the port 74 back into the working chamber 60 until the annular levels in both the working chamber 60 and the reservoir chamber 70 are at the same level, at which time the housing 30 and, hence, the fan 22 rotate at a minimal slip-speed with respect to the clutch plate 58, thereby effecting a so-called "engaged mode" or maximum cooling function.

So long as the inlet port 74 in the pump plate 50 remains open, a fluid circulation process will prevail, i.e., the rotating pump or dam elements 73 will continue to promote the flow of fluid from the working chamber 60 through the pump outlet openings 72 into the annular reservoir 70, from whence it will return to the working chamber 60 via the open inlet ports 74.

Referring now to the embodiment of FIGS. 2–4, it may be noted that selected circumferentially spaced fins 96 are formed to a greater height than the height of the usual fins 46 formed on the cover member 38. A plurality of radially oriented, canted fan blades 98 are attached to the top edges of the selected taller fins 96 for supplementing the cooling of the viscous fluid in the housing 30 by the fins 46 when the housing is rotated by the fluid drive coupling. A hub member 100, coaxial with the cover member 38 and spaced axially therefrom so as to clear the bimetallic thermostatic valve control element 82, interconnects the inner ends 102 of the plurality of fan blades 98. An axial opening 104 is formed through the hub member 100 to assure that communication of ambient air to the underlying bimetallic control element 82 will not be hampered. An arcuate or other suitably shaped support segment 106 is secured between the cover member 38 and the outer tip 108 of each fan blade 98 for rigidifying the fan blades.

As shown in FIG. 5, it may be noted that, in lieu of the radial fins 46 of FIG. 3, a plurality of concentric rows of spaced, arcuate-shaped cooling fins 110 are formed on the front cover member 38. An arcuate-shaped support segment 112 (FIG. 7) is integrally formed on each of selected radially outer arcuate-shaped fins 114. A hub member 116 having an axial opening 118 formed therethrough to provide unobstructed access of ambient air to the bimetallic thermostatic valve control element 82, is coaxial with the cover member 38 and spaced axially therefrom. A plurality of circumferentially spaced, radially oriented, canted fan blades 120 have their outer portions attached to the support segments 112 and their inner end portions attached to the hub member 116 for aiding in the viscous fluid in the housing 30 when the housing is being rotated by the fluid drive coupling.

It should be apparent that the conventional front cover cooling fins for a viscous fluid coupling have been supplemented by novel blade means integrally associated with the fins for aiding in the cooling of the usual viscous fluid to thereby prolong its operational life.

It should also be apparent that the number and/or angle of inclination of the canted cover member blades may be varied for particular vehicular applications.

While but two embodiments of the invention have been shown and described, other modifications thereof are possible.

The embodiments of the invention in which an exclusive property or privilege is claimed are defined as follows:

1. In a viscous fluid coupling for vehicle use having a drive shaft, driven means including a housing comprising a front cover member having cooling fins thereon and rotatably mounted on the drive shaft, driving means including a drive plate mounted on the shaft within the housing for rotation with the shaft, opposed shear surfaces on the drive plate and the adjacent surface of the housing disposed in close face-to-face and spaced relationship, and viscous fluid in the housing for creating fluid drive coupling of the housing and the drive plate, the improvement comprising a hub coaxial with the cover member and spaced axially therefrom, and a plurality of circumferentially spaced, substantially radially oriented fan blades having their inner ends attached to the hub and having at least their outer ends attached to the cover member inwardly of the outer periphery thereof.

2. In a viscous fluid coupling for vehicle use having a drive shaft, driven means including a housing comprising a front cover member having spaced, radially extending cooling fins thereon and rotatably mounted on the drive shaft, driving means including a drive plate mounted on the shaft within the housing for rotation with the shaft, opposed shear surfaces on the drive plate and the adjacent surface of the housing disposed in close face-to-face and spaced relationship, and a viscous fluid in the housing for creating fluid drive coupling of the housing and the drive plate, the improvement comprising a hub member coaxial with the cover member and spaced axially therefrom, arcuate-shaped support segments secured at predetermined circumferentially spaced locations on the cover member inwardly of the outer periphery thereof, and a plurality of radially oriented, canted fan blades having their inner ends attached to the hub and their ends attached to the support segments for cooling the viscous fluid in the housing when the housing is rotated by the fluid drive coupling.

3. In a viscous fluid coupling for vehicle use having a drive shaft, driven means including a housing comprising a front cover member having spaced, radially extending cooling fins thereon and rotatably mounted on the drive shaft, driving means including a drive plate mounted on the shaft within the housing for rotation with the shaft, opposed shear surfaces on the drive plate and the adjacent surface of the housing disposed in close face-to-face and spaced relationship, and a viscous fluid in the housing for creating fluid drive coupling of the housing and the drive plate, the improvement comprising selected fins being formed to a greater height than that of the remaining fins, a plurality of circumferentially spaced, radially oriented, canted fan blades attached to the edges of the selected taller fins for cooling the viscous fluid in the housing when the housing is rotated by the fluid drive coupling, a hub member for interconnecting the inner ends of the plurality of fan blades, and an arcuate-shaped support segment secured between the cover member and the outer tip of each fan blade for rigidifying the fan blades.

4. In a viscous fluid coupling for vehicle use having a drive shaft, driven means including a housing comprising a front cover member and rotatably mounted on the drive shaft, driving means including a drive plate mounted on the shaft within the housing for rotation with the shaft, opposed shear surfaces on the drive plate and the adjacent surface of the housing disposed in close face-to-face and spaced relationship, and a viscous fluid in the housing for creating fluid drive coupling of the housing and the drive plate, the improvement comprising a plurality of concentric rows of spaced, arcuate-shaped cooling fins formed on the front cover member, an arcuate-shaped segment integrally formed on each of selected radially outer arcuate-shaped fins, a hub member coaxial with the cover member and spaced axially therefrom, a plurality of circumferentially spaced, radially oriented, canted fan blades having their outer portions attached to the support segments and their inner end portions attached to the hub member for cooling the viscous fluid in the housing when the housing is rotated by the fluid drive coupling.

* * * * *

UNITED STATES PATENT AND TRADEMARK OFFICE
CERTIFICATE OF CORRECTION

PATENT NO. : 4,181,205
DATED : January 1, 1980
INVENTOR(S) : Donald F. Mennucci, John T. Auman It is certified that error appears in the above–identified patent and that said Letters Patent are hereby corrected as shown below:

Column 4, line 57 after "and" insert -- a -- .

Column 5, line 15 after "their" insert -- outer -- .

Signed and Sealed this

Twenty-seventh Day of May 1980

[SEAL]

*Attest:*

SIDNEY A. DIAMOND

*Attesting Officer*  *Commissioner of Patents and Trademarks*